Figure 5:
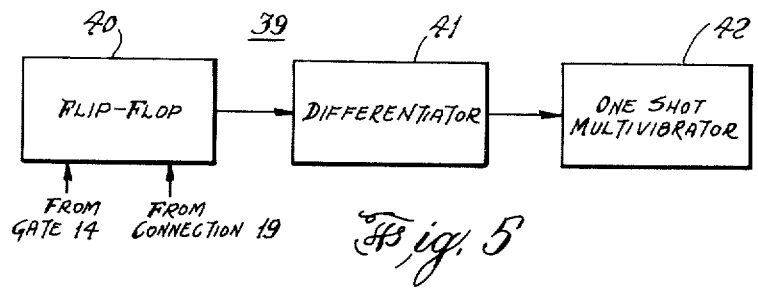

United States Patent [19]
Broder et al.

[11] 3,878,381
[45] Apr. 15, 1975

[54] CORRELATION CIRCUIT INCLUDING VERNIER

[75] Inventors: Alan Broder, Albertson; Paul Shapiro, Planview; Seening Yee, Whitestone, all of N.Y.

[73] Assignee: The United States of America as represented by the Secretary of the Navy, Washington, D.C.

[22] Filed: Dec. 7, 1966

[21] Appl. No.: 599,974

[52] U.S. Cl. ............ 235/181; 735/150.53; 328/109; 343/100 CL; 343/113 R
[51] Int. Cl. .................... G06f 15/34; G01s 3/46
[58] Field of Search .................. 343/100 CL, 113 R; 235/181; 328/109, 110

[56] References Cited
UNITED STATES PATENTS
3,145,341  8/1964  Andrew .................. 343/100 CL X

*Primary Examiner*—T. H. Tubbesing
*Attorney, Agent, or Firm*—Richard S. Sciascia; Arthur A. McGill; Prithvi C. Lall

[57] ABSTRACT

A correlation technique that has application in sonar, radar, and communications and involves separately detecting, simultaneously with two separate means, signal energy from one source, which signal energy has traversed non-identical paths, binary quantizing the two separately detected waveforms, sampling the two binary quantized waveforms at an identical rate, delaying the quantized binary sampling of one detected waveform with respect to the quantized binary sampling of the other by an incremental delay, multiplying the delayed sampling by the undelayed sampling, integrating the product for each of a plurality of delay increments, and registering as a correlogram integrator output versus delay. Peak value on the correlogram occurs where the delay corresponds to the difference in times of arrival of the signals at the separate detection means.

With the above described technique signal-to-noise ratio can be increased and difference in time of arrival can be determined. From the difference in time of arrival, azimuthal bearing of the source may be determined.

3 Claims, 21 Drawing Figures

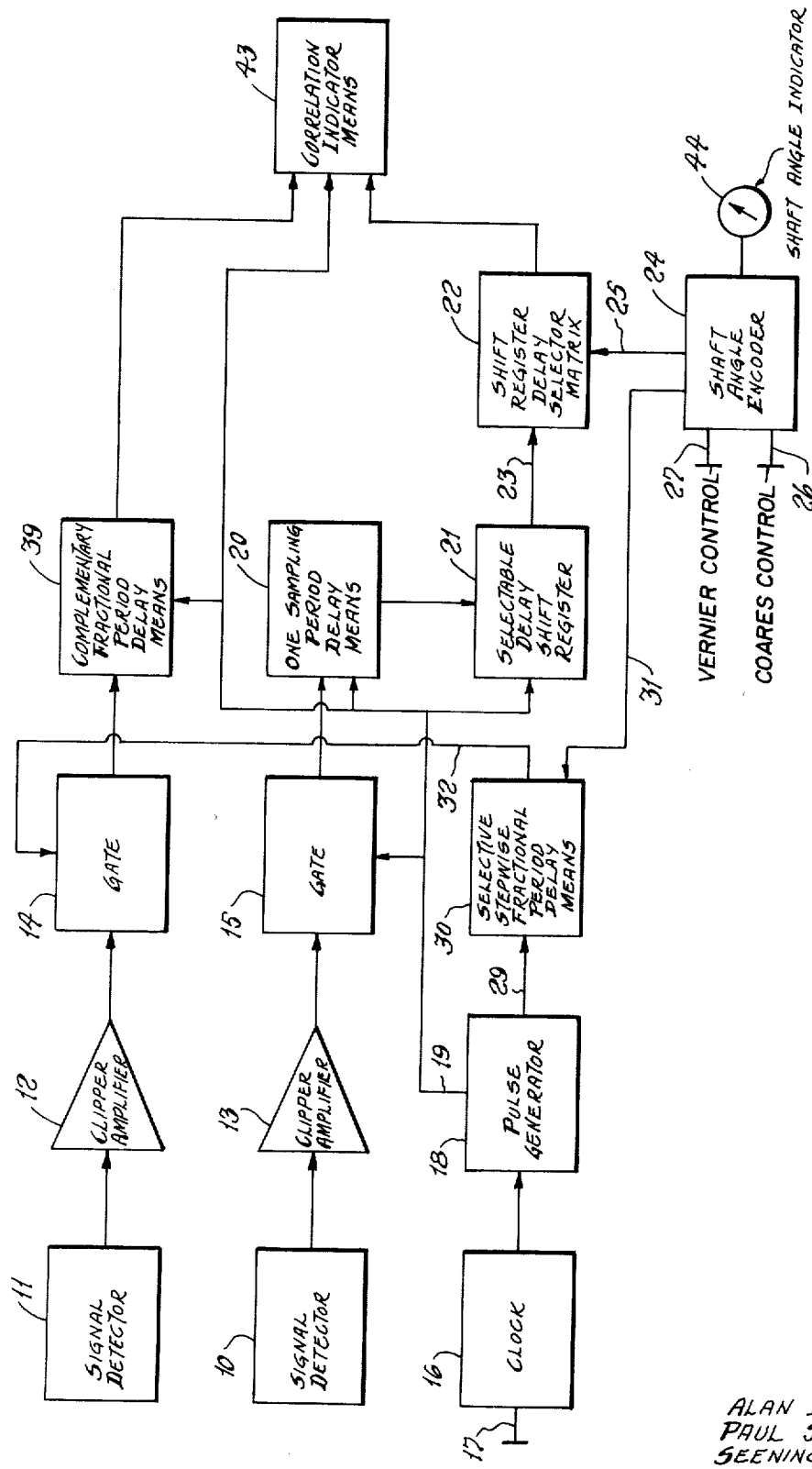

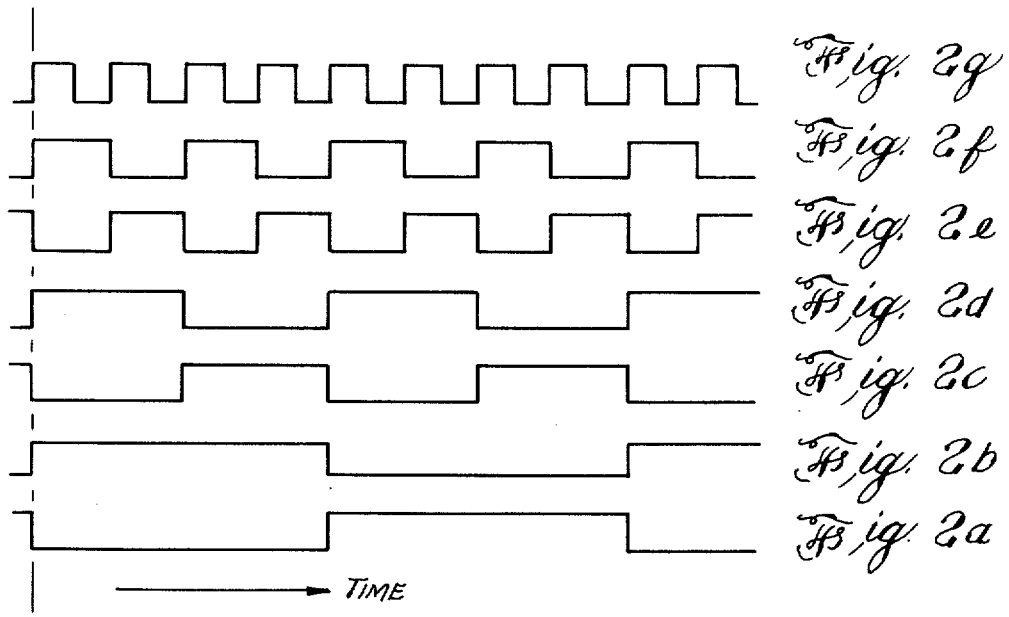
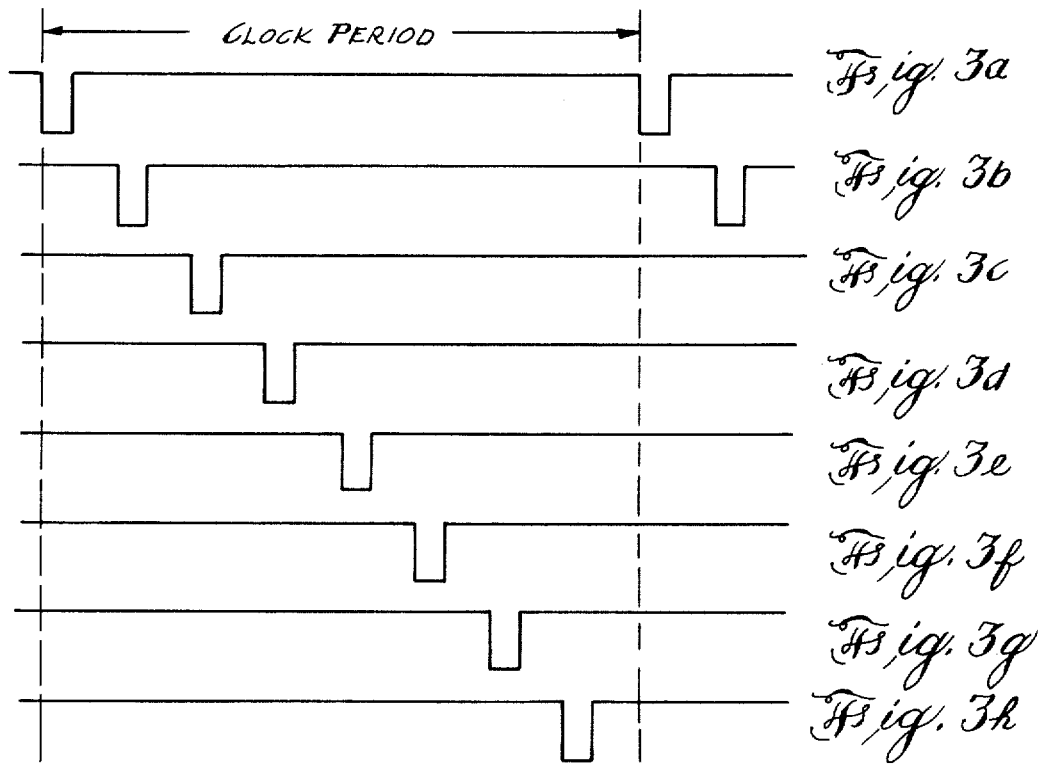

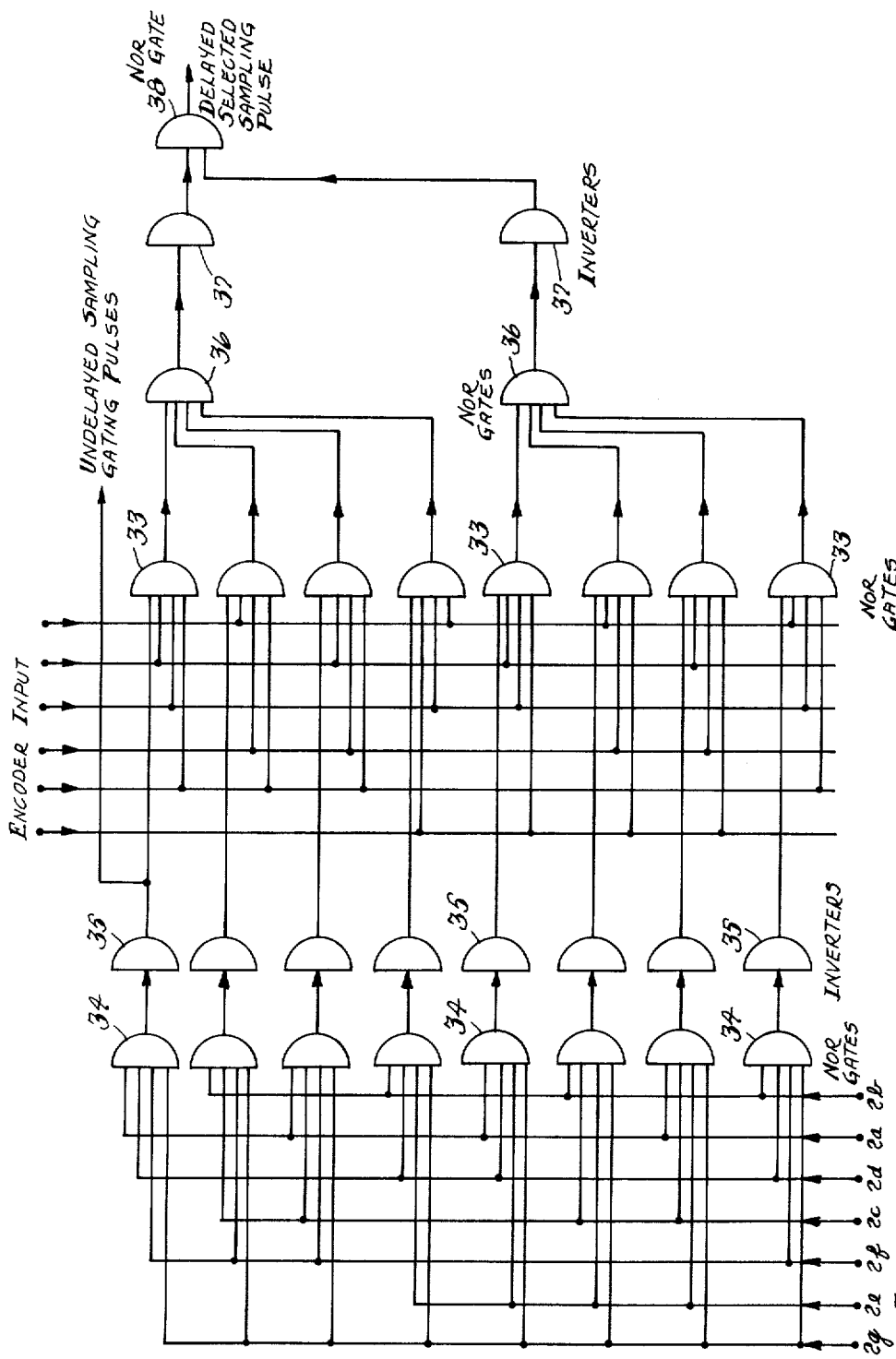

CORRELATION CIRCUIT INCLUDING VERNIER

Digital shift registers have been employed to delay the sampling of one waveform relative to the sampling of the another waveform in the correlation technique described. By this method relative time shift of the waveforms is achieved in discrete units of time. The precise delay required for the two waveforms to be sampled at the corresponding points is generally not attainable with the described technique. While finer increments of delay are obtainable by increasing the sampling rate, this method has a major disadvantage in that it necessitates increasing the number of shift register stages and other correlation stages.

An object of this invention is to improve correlation techniques of the type described by achieving more precise correlation without substantially increasing the amount of equipment for correlation.

Other objects and advantages will appear from the following description of an example of the invention, and the novel features will be particularly pointed out in the appended claims.

Figure 6:
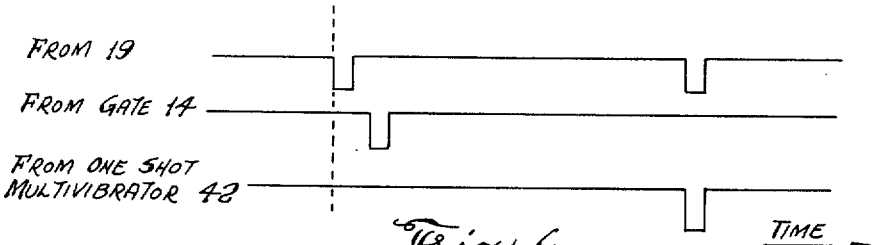
Figure 7:
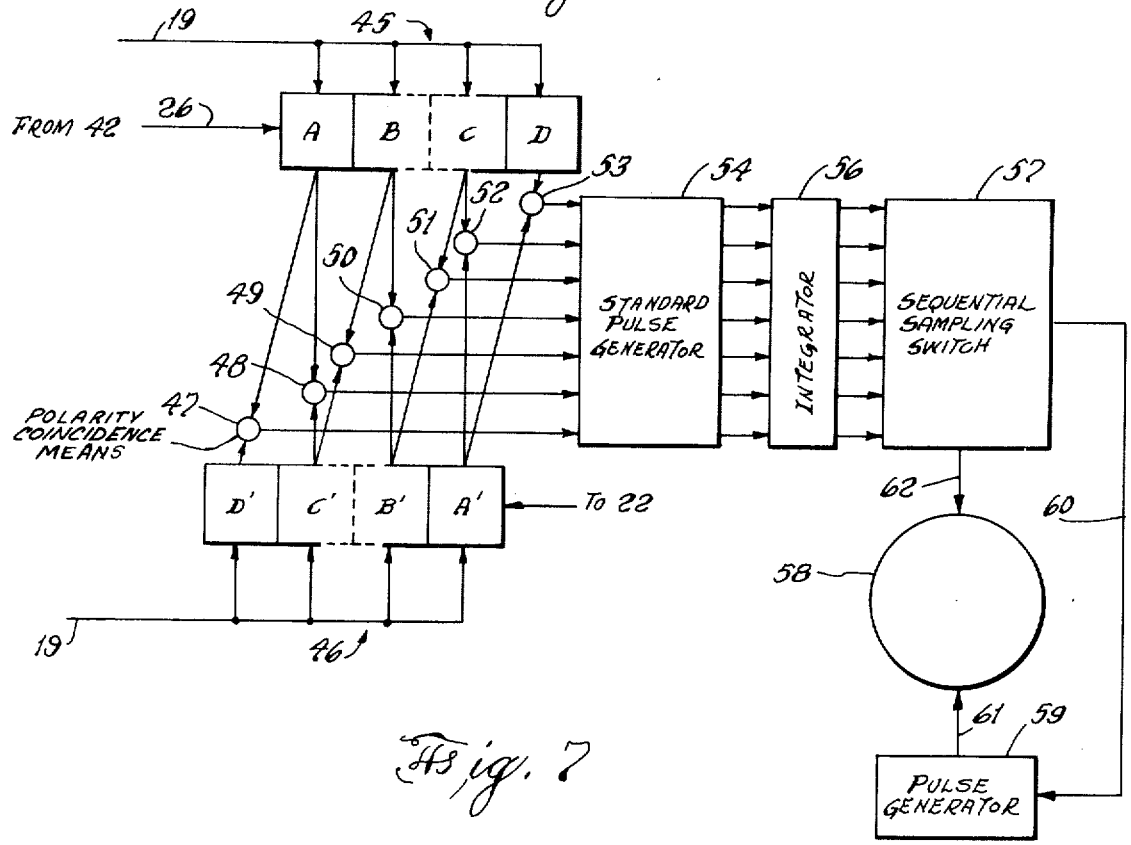
Figure 8:
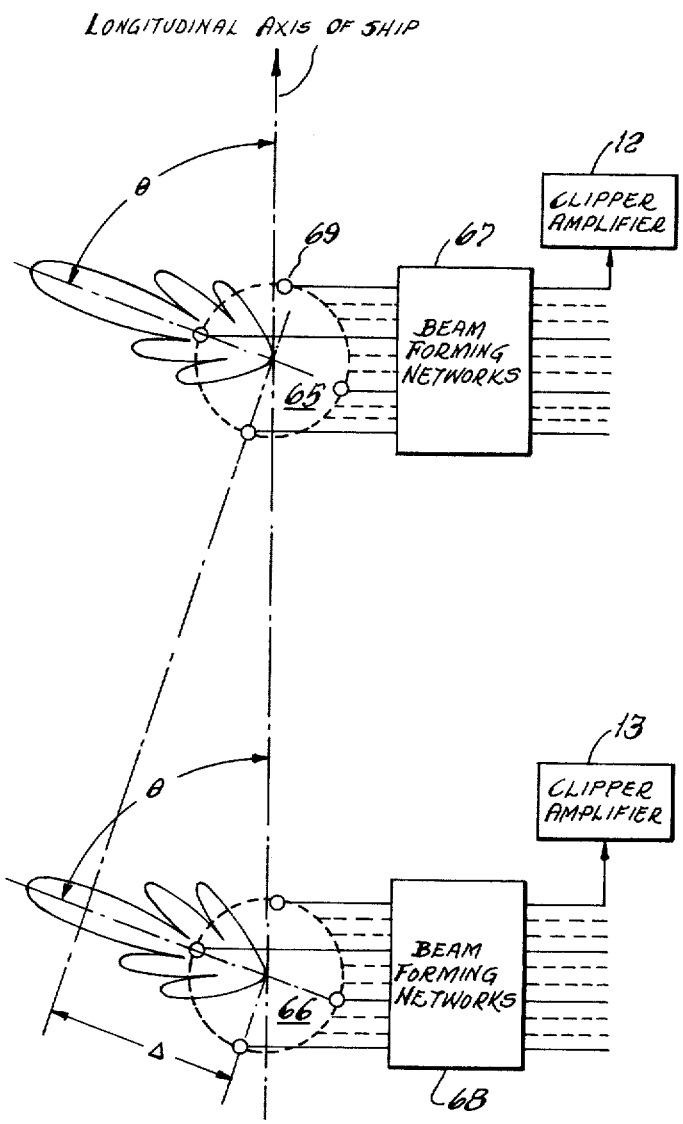

FIG. 1 is a block diagram of an embodiment of this invention,

FIGS. 2a–2g graphically illustrate pulse outputs of the pulse generator of FIG. 1, FIGS. 3a–3h graphically illustrate the outputs of the selective stepwise fractional period delay means of FIG. 1, FIG. 4 is a logic circuit diagram of the selective stepwise fractional period delay means of FIG. 1, FIG. 5 illustrates a circuit arrangement for the complementary fractional period delay means of FIG. 1, FIG. 6 illustrates graphically the retiming function of the complementary fractional period delay means of FIG. 1, FIG. 7 shows a circuit arrangement for the correlation indicator means of FIG. 1, and FIG. 8 is an illustration of one application of the invention.

In the embodiment shown in FIG. 1, there are provided identical signal detectors 10 and 11 for providing essentially identical signal energy waveforms which are in phase or are displaced up to a known maximum time interval. The signal detectors may be identical directional sonar, radar or communication equipments spaced a known distance apart and operable in train so as to be oriented in the same direction relative to the line joining the detectors. Signal energy arriving at the two detectors from a common source will be displaced in time by an amount which is the product of the difference in distance between the source and the two detectors and the speed of the signal energy through the medium between the source and the two detectors. Since there is a direct relationship between bearing and difference in distance, and since the speed of the signal energy through the medium is known or measurable, the bearing of the source can be determined by measuring the length of time by which the leading waveform is to be delayed to bring the two waveforms into time coincidence.

Clipper-amplifier circuits 12 and 13 are coupled to the signal detectors 11 and 10 respectively. The signal waveforms from the detectors are amplified and clipped to convert them into binary quantized, squared, rectified waveforms having a selected high amplitude and a selected low amplitude; the quantized waveforms have their low amplitude between those points of the corresponding signal waveform where its amplitude does not exceed a selected reference level. Identical gating means 14 and 15 are coupled to the outputs of the clipper-amplifiers 12 and 13. The gates are normally in a blocking state and are unblocked during the intervals that gating pulses are coupled into the gates 14 and 15 respectively. A clock 16 provides timing pulses at the selected sampling rate and has a manual adjustment knob for selecting the sampling rate. Good results are obtained if the clock 16 provides timing pulses at a rate which is 2 to 3 times the highest frequency of interest in the detected signal.

A pulse generator 18 connected to clock 16 provides a gating pulse of predetermined length for each clock pulse and delivers these gating pulses over conductor 19 to gate 15. A one sampling period delay means 20 is connected to the output of gate 15 and to conductor 19. The delay means 20 which may be one stage of a shift register delays the output of gate 15 by one sampling period.

A selectable delay shift register 21 is coupled to the output of delay means 20 and to the conductor 19; the delay means 20 and the shift register 21 may be part of the same physical element wherein the delay means is the first stage. The sample delivered by gate 15 is delayed by one samplying period in delay means 20 and either is not delayed or is further delayed by any number of samplying periods up to that number of samplying periods corresponding to the number of stages in the shift register 21.

A shift register delay selector 22 is connected by cable 23 to the outputs of shift register 21 to deliver either the output of the delay means 20 not delayed in the shift register or after delay by any number of the shift register stages. The shift register has an output at each stage, not shown. The selector matrix selects the signal before delay or the output of any stage of the shift register, thereby in effect selecting the length of the shift register in increments of the clock pulse period.

The selector matrix 22 is a conventional diode matrix as disclosed in "Digital Computer Components and Circuits" by R.K. Richards, D. Van Nostrand Co. 1957, page 57, FIG. 2–12(b) for accepting an output of the shift register fron none, i.e. before the first stage, or from any stage of the shift register 21. The selector matrix is controlled by a set of binary outputs from conventional shaft angle encoder 24 delivered over conductors of cable 25.

The shaft angle encoder 24 is selected to have adequate resolution for, and the delay selector 22 is selected to have a sufficient number of devices for the number of stages employed in the shift register 21. While only a single connection 25 is shown between the delay selector 22 and the encoder 24 and a single connection 23 is shown between the shift register 21 and the delay selector 22, these connections are symbolic only it being understood that the number of connections is related to the number of stages in the shift register and to the number of binary outputs provided by the encoder 24 to the delay selector 22. The encoder 24 has a coarse and fine or vernier control 26 and 27. The vernier control 27 is provided to adjust the encoder between any two steps obtainable with the coarse control 26, the binary outputs controllable by the vernier control are delivered by the conductors of cable 25.

Shift register 21 introduces a delay in the sampled quantized signal not only based upon the setting of control 26 but also as a function of the repetition rate of the clock pulses. Therefore the delay introduced by shift register 21 can be adjusted by adjusting the clock 16. When the clock pulse rate is adjusted to set the delay introduced by the shift register, the sampling rate at the two gates 14 and 15 are similarly adjusted. However, slight adjustment in the clock pulse rate while significant to the preciseness in delay, is not significant to the sampling rate.

When pulse generator 18 is triggered by a pulse delivered by clock 16, the pulse generator supplies a pulse to connection 19 for delivery to the gate 15 and delay means 20 and shift register 21; also, in response to the same clock pulse, pulse generator 18 delivers to separate conductors of cable 29 a plurality of square wave pulse trains as illustrated in FIG. 2a through 2g. In each pulse train, the low and the high each occupy half the period. Pulse trains shown in FIG. 2a and FIG. 2b, FIG. 2c and FIG. 2d, FIG. 2e and FIG. 2f are in mirror image relationship respectively. The period of the pulse trains in FIG. 2a and FIG. 2b is the same as the period of the clock pulses. The frequency of the pulse train in FIG. 2g is twice that in FIG. 2e and FIG. 2f, and is 4 times that in FIG. 2c and FIG. 2d and is 8 times that in FIG. 2a and FIG. 2b. Cascaded multivibrators may be used in the pulse generator 18 to provide the outputs shown in FIG. 2a–FIG. 2g. The pulse trains are delivered in parallel in the time relationship shown over separate conductors of the cable 29 to a selective stepwise fractional period delay means 30 which is a matrix controlled by the vernier binary outputs of encoder 24 transmitted through cable 31.

The several pulse trains shown in FIGS. 2a–2g are delivered to selective stepwise fractional period delay means 30 for delivering one pulse for each pulse delivered on connection 19 and of the same length but displaced in time relative thereto by a fraction of the clock period in one of seven possible equal steps as shown in FIG. 3b–3h wherein FIG. 3a illustrates the output waveform delivered by connection 19. The output of the selective stepwise fractional period delay means 30 is delivered by connection 32 to gate 14 whereby the two gates 14 and 15 are unblocked at the same rate and for the same length sampling intervals and either in step or out of step lagging by multiples of one-eight the clock period.

In FIG. 4 there is shown a logic circuit arrangement for the selective stepwise fractional period delay means 30 for division of the clock period into eight vernier steps. It is to be understood that the clock period may be divided into fewer steps or a larger number of steps without departing from the principles of the invention. To provide for eight vernier steps the encoder is selected to have three pairs of binary outputs delivered to the fractional period delay means. Thus, eight different combinations made up of one output of each of the three pairs are obtainable by adjustment of the vernier control 27 at any setting of coarse control 26. The eight different combinations are delivered to eight identical logic elements 33 having four inputs and one output, e.g., NOR gates, whereby a different one of the logic elements is enabled for each of eight possible settings of the vernier control 27. The fourth inputs of the logic elements 33 are connected to eight identical combinations of logic elements 34 and 35, e.g., NOR gates followed by inverters, each of which combinations have four inputs and one output. The pulse generator 18 delivers three pairs of binary waveforms FIG. 2a and 2b, FIG. 2c and 2d, FIG. 2e and 2f, which provide eight possible binary combinations of lows and highs, and a fourth waveform to all eight logic combinations which waveform has one-eighth the period of the clock whereby during each successive ⅛ period of the clock pulse a different one of the combinations of logic elements provides an output having a pulse length determined by the fourth waveform FIG. 2g to the respective logic elements 33. Therefore only the logic element 33 enabled by selection of the vernier setting of the encoder provides one output pulse during each clock period and having a pulse length approximately one-sixteenth the clock period. Logic elements 36, 37 and 38, e.g., NOR gates, inverters, and NOR gate respectively provide the gating pulses at the selected vernier delay. Each of the eight logic element combinations 34 and 35 deliver an output pulse during each clock period, the output of that logic combination 34 and 35 which is delivered by the fractional period delay means 30 when the encoder vernier is set at zero delay is delivered to connection 32 as the undelayed samplying gating pulses.

The output of the gate 14 is further delayed for another fraction of the clock period in complementary fractional period delay means 39 and the output of the gate 15 is delayed one full clock period by the one sampling period delay means 20. In operation, let it be assumed by way of example that identical sinusoidal waveforms are delivered by detectors 10 and 11 but the one from detector 10 leads the one from detector 11 by ⅛ period. By delivering sampling gating pulses to gate 14 one-eighth clock period behind those delivered to gate 15, samplings from both gates are identical but the sampling from gate 15 leads the sampling from gate 14 by one-eighth the clock period. By delaying the output of gate 14 by ⅞ period, the complementary fractional period and by delaying the output of gate 15 by one full period, the samplings are made to coincide.

The complementary fractional period delay means 39 may be a circuit as shown in FIG. 5 including flip-flop 40 deriving one input from connection 19 and the other input derived from gate 14 and a diode not shown, and a differentiator 41 responsive only to the change of state of flip-flop 40 initiated by a pulse from connection 19 for triggering a one-shot multivibrator 42 whose output pulse length is equal to that from shift register delay selector 21. The operation of the complementary fractional period delay means 39 is illustrated graphically in FIG. 6.

A correlation indicator means 43 is coupled to the outputs of the complementary fractional period delay means 39, and the shift register delay selector 22. After coarse control 26 is adjusted to select that delay in shift register 21 for providing a peaked response indication on the correlation indicator means 43 and is further adjusted to center the peak along the horizontal sweep, the vernier control 27 is adjusted to optimize the indication. Encoder 24 includes a shaft angle indicator 44 which may be calibrated in terms of delay, bearing angle, or other.

A suitable correlation indicator means 43 is shown in FIG. 7 and includes a pair of identical shift registers 45 and 46 and polarity coincidence means 47 through 53. The shift registers 45, 46 are illustrated as having four stages A, B, C, D and A', B' C', D' respectively, for simplicity of illustration and explanation; the shift registers have many times four stages, the additional stages being suggested by the broken lines joining stages B and C and B' and C'. The number of coincidence means are derived at in the manner illustrated. Each coincidence means provides an output only when the two shift register stages to which it is connected are in the same ones of their binary states. A standard pulse generator 54 is connected to the outputs of all the polarity coincidence elements to preclude variations among their outputs and enhance the response accuracy of the correlator. The standard pulse generator includes a separate pulse generator for each coincidence means, e.g., a one-shot multivibrator. The outputs of standard pulse generator 54 are delivered to an integrator 56 having separate but identical integrator means one for each coincidence element. A sequential sampling switch 57 is connected to the integrator outputs. Degree of correlation or non-correlation may be observed on a cathode ray tube indicator device 58 having its horizontal sweep circuit synchronized with the operation of the sequential sampling switch 57. The synchronization is achieved by means of a pulse generator 59 which delivers one output on connection 60 for stepping the sampling switch 57 and another output on connection 61 for triggering the horizontal sweep generator of the indicator 58. Pulse generator 59 may be a motor driven magnetic disk arrangement. A sweep is triggered in coincidence with the sampling of an integrated output derived from coincidence element 47. The integrator outputs are sequentially sampled by switch 57 and are delivered by connection 62 to the vertical deflection means of the indicator 58. Maximum vertical deflection is at that horizontal position corresponding to the sampled integrator storing the maximum charge.

A spot appears on the screen of the CRT indicator corresponding to each integrator. Since the time for rise and fall of the vertical deflection is neglible compared to the length of time that the spot is at the level corresponding to the respective integrator output, there is no vertical line between the datum line and the spot. The multiplexing and sweep rate is not related to the signal sampling rate the former being substantially slower.

The maximum spot deflection is clearly distinguishable to indicate target bearing. Since vernier adjustment causes minor variation in deflection, the vernier adjustment to be meaningful must derive from standard pulses, which are supplied by the standard pulse generator.

If signal pulses from the delay selector 22 and the fractional period delay means are in time phase, the signals are shifted through the respective shift registers 46 and 45 of the correlation means at the clock rate and arrive in stages B and B' in coincidence. Only coincidence detector 50 receives inputs from stages B and B'; therefore when this condition prevails detector 50 will produce maximum average output. If the signals to the shift registers derive from samplings of the respective waveforms that are out of phase by a fraction of the clock period, the maximum average output and thus the maximum vertical deflection on the indicator is less than it would be if the samplings are of in-phase points along the two waveforms.

One application for this invention is in the system of the type described in copending application Ser. No. 398,486 for Yaw Compensated Correlating Sonar Tracking System by Alan Broder, Paul Shapiro and Seening Yee, which system employs a pair of spaced directional hydrophone arrays for detecting underwater sources of sound even if signal- to-noise ratio at the receivers is poor and for ascertaining the bearing of the source from the relative times of arrival of the sound at the receivers. The system shown in FIG. 8 includes a pair of phased hydrophone arrays 65 and 66 mounted on the underside of a vessel a fixed distance apart along the longitudinal dimension or keel. Selective beam forming networks 67 and 68 are connected to the hydrophone elements 69 of both arrays to characterize the arrays with selectable pairs of overlapping beams wherein each pair is oriented along a respective azimuth $\theta$ relative to the line joining centers of the two arrays. The signals received when the beam forming networks are set at any of the various azimuth angles transmitted through identical bandpass filters and are quantized and sampled as described above. The signal data derived from the array having the shorter propagational path relative to the underwater sound source is delayed in the selectable delay shift register 21 such that signals from a source would be brought into time coincidence at the inputs to the correlator. The quantized, sampled and suitably delayed signals are processed in digitalized form by the correlator to provide a correlogram on indicator 58 of signals received within a selected pair of directional beams of the two arrays. The correlogram is produced by a multiplicity of integrated voltages, each of which is displayed as a point on the correlogram which is an A type cathode ray tube presentation except that the horizontal dimension of the display corresponds to the target beaming. Noise-like signals and all other signals uncorrelated at the arrays are discriminated against as a function of the length of time during which the aforesaid voltages are integrated.

It will be understood that various changes in the details, materials, and arrangements of parts (and steps), which have been herein described and illustrated in order to explain the nature of the invention, may be made by those skilled in the art within the principle and scope of the invention as expressed in the appended claims.

We claim:
1. In combination with a pair of gates for sampling substantially identical binary quantized waveforms,
    means for unblocking one of the gates at a predetermined sampling rate and for unblocking the other gate at said sampling rate in any selected one of several phase relationships relative to the unblocking of said one gate wherein said several phase relationships include in-phase and out of phase by one of several equal step fractional divisions of the sampling period,
    means triggered by the first means in coincidence with the unblocking of the one gate for further delaying the output of the other gate by an interval equal to the compliment of the fraction of the sampling period by which the output of the other gate is delayed,
    and means triggered by the first means in coincidence with the unblocking of the first gate for de- laying the output of the one gate by one sampling period.

2. The combination defined in claim 1 further comprising, additional delay means triggered by the first means in coincidence with the unblocking of the first gate for further delaying the output of said one gate by an interval equal to any selected one of a plurality of integral multiples of the sampling period including zero, and correlation means coupled to the outputs of said complimentary period delay means and said additional delay means triggered by the first means in coincidence with the unblocking of the first gate.

3. An improved signal correlation system comprising two essentially identical signal waveform detectors for intercepting signals from the same source, separate means for converting the signal waveforms from the respective detectors into squared binary waveforms wherein the lows are in time coincidence with those levels of the respective signal waveforms which are to one side of a selected reference level, a first and second gate coupled to the outputs of the separate means for normally blocking the binary waveform outputs and for unblocking in coincidence with applied gating pulses, means for providing a first train of pulses having a particular pulse repetition frequency wherein pulse length is approximately one-sixteenth of the pulse period, and providing a plurality of additional trains of pulses one of which has the same period as said first pulse train and the others having periods that are one-half, one-quarter and one-eighth of the period of the first train of pulses and wherein the leading edges of pulses in the first pulse train coincide with the leading edges of pulses in each of the other pulse trains, and wherein the pulse lengths in each of the additional trains of pulses are one-half the pulse period of the respective additional train, means for coupling said first pulse train to said first gate for unblocking the first gate, selective stepwise fractional period delay means coupled to said pulse providing means and having eight operating conditions for delivering a pulse train to the second gate identical to said first pulse train displaced relative thereto $n/8$ period, where $n$ is any one of 0,1,2, 3, 5, 6, 7, an encoder for setting said selective stepwise fractional period delay means to one of its operating conditions, a selectable delay shift register coupled to said first pulse train output of said pulse providing means to delay the sampling from said first gate a number of periods of said first pulse train, a shift register delay selector coupled to said encoder and to said selectable delay shift register for selecting the delay of said shift register and for delivering the delayed output, a complimentary fractional period delay means coupled to the output of said second gate and to said first pulse train output of said pulse providing means to delay the sampling from said second gate by an amount which is the compliment of the fraction of the period of delay introduced into the sampling of the second gate relative to the sampling of the first gate, means coupled to said one pulse train output of said pulse providing means for further delaying the sampling delivered by said first gate by one pulse period of said first pulse train, and means coupled to the output of said complimentary fractional period delay means and to the output of said shift register delay selection means for indicating signal waveform correlation.

* * * * *